US011696124B2

(12) United States Patent
Srivastava et al.

(10) Patent No.: US 11,696,124 B2
(45) Date of Patent: Jul. 4, 2023

(54) SECURE COMMUNICATIONS FOR A CLIENT DEVICE INVOLVING AUTHENTICATION AND KEY MANAGEMENT FOR APPLICATIONS (AKMA)

(71) Applicant: Cisco Technology, Inc., San Jose, CA (US)

(72) Inventors: Vimal Srivastava, Bangalore (IN); Ravi Shekhar, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 17/497,320

(22) Filed: Oct. 8, 2021

(65) Prior Publication Data

US 2023/0115314 A1    Apr. 13, 2023

(51) Int. Cl.
*H04W 12/0433* (2021.01)
*H04W 12/033* (2021.01)
(Continued)

(52) U.S. Cl.
CPC ..... *H04W 12/0433* (2021.01); *H04W 12/033* (2021.01); *H04W 12/041* (2021.01); *H04W 12/0431* (2021.01)

(58) Field of Classification Search
CPC ........... H04W 12/0433; H04W 12/033; H04W 12/041; H04W 12/0431
See application file for complete search history.

(56) References Cited

U.S. PATENT DOCUMENTS

2021/0168599 A1    6/2021  Ben Henda et al.
2022/0345307 A1*  10/2022  You ...................... H04L 9/0891

FOREIGN PATENT DOCUMENTS

WO    2021031053 A1    2/2021
WO    2021093164 A1    5/2021
(Continued)

OTHER PUBLICATIONS

Lei et al. (5G Security System Design for All Ages | SpringerLink), Section, 6.6.11 https://link.springer.com/chapter/10.1007/978-3-030-73703-0_6 (Year: 2021).*

(Continued)

*Primary Examiner* — Michael Simitoski
*Assistant Examiner* — Andrew Suh
(74) *Attorney, Agent, or Firm* — Edell, Shapiro & Finnan, LLC

(57) ABSTRACT

Presented herein are techniques to facilitate secure communications with an Application Function (AF) for a client device that does not support Authentication and Key Management for Applications (AKMA) functionality. In one example, a method includes obtaining, by a user plane function (UPF), a first uplink data packet from a client device, wherein the first uplink data packet is to be communicated to an application; determining, by the UPF based on the first uplink data packet, whether the client device supports AKMA functionality; based on determining that the client device does not support the AKMA functionality, buffering at least the first uplink data packet by the user plane function and determining whether the application supports the AKMA functionality; and based on determining that the application supports the AKMA functionality, performing AKMA functionality by the UPF for the client device for data communications between the client device and the application.

20 Claims, 7 Drawing Sheets

(51) Int. Cl.
*H04W 12/041* (2021.01)
*H04W 12/0431* (2021.01)

(56) References Cited

FOREIGN PATENT DOCUMENTS

| WO | 2021098115 A1 | 5/2021 | |
|---|---|---|---|
| WO | WO-2021098115 A1 * | 5/2021 | ......... H04L 63/0876 |
| WO | 2021148027 A1 | 7/2021 | |

OTHER PUBLICATIONS

The European Union Agency for Cybersecurity (ENISA) (Security in 5G Specifications—Controls in 3GPP), pp. 33 https://www.enisa.europa.eu/publications/security-in-5g-specifications (Year: 2021).*
J. Arkko et al., "Extensible Authentication Protocol Method for 3rd Generation Authentication and Key Agreement (EAP-AKA)", Network Working Group, RFC 4187, Jan. 2006, 79 pages.
J. Arkko et al., "Improved Extensible Authentication Protocol Method for 3rd Generation Authentication and Key Agreement (EAP-AKA')", Network Working Group, RFC 5448, May 2009, 29 pages.
3GPP, "3rd Generation Partnership Project; Technical Specification Group Services and System Aspects Authentication and Key Management for Applications (AKMA) based on 3GPP credentials in the 5G System (5GS) (Release 17)", 3GPP TS 33.535 V17.2.1, Jun. 2021, 24 pages.
GSMA, "IoT SAFE: Robust IoT security at scale", Jun. 2021, 25 pages.
GSMA, "Common Implementation Guide to Using the SIM as a 'Root of Trust' to Secure IoT Applications", Iot.04, Version 1.0, Dec. 3, 2019, 54 pages.
3GPP, "3rd Generation Partnership Project; Technical Specification Group Services and System Aspects; System architecture for the 5G System (5GS); Stage 2 (Release 17)", 3GPP TS 23.501 V17.1.1, Jun. 2021, 526 pages.
3GPP, "3rd Generation Partnership Project; Technical Specification Group Services and System Aspects; Security architecture and procedures for 5G system (Release 17)", 3GPP TS 33.501 V17.2.1, Jun. 2021, 257 pages.
3GPP, "3rd Generation Partnership Project; Technical Specification Group Services and System Aspects; Generic Authentication Architecture (GAA); Generic Bootstrapping Architecture (GBA) (Release 17)", 3GPP TS 33.220 V17.1.0, Jun. 2021, 95 pages.
3GPP, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.3.0, Sep. 2021, 24 pages.
3GPP, "3rd Generation Partnership Project; Technical Specification Group Services and System Aspects; Security architecture and procedures for 5G system (Release 17)", 3GPP TS 33.501 V17 3.0, Sep. 2021, 258 pages.

* cited by examiner

SECURE COMMUNICATIONS FOR A CLIENT DEVICE INVOLVING AUTHENTICATION AND KEY MANAGEMENT FOR APPLICATIONS (AKMA)

TECHNICAL FIELD

The present disclosure relates to network equipment and services.

BACKGROUND

Networking architectures have grown increasingly complex in communications environments, particularly mobile networking environments. In particular, security functionality involving Authentication and Key Management for Applications (AKMA) is currently being studied for Third Generation Partnership Project (3GPP) deployments. However, many 3GPP devices will likely not support AKMA functionality in the near future. Accordingly, there are significant challenges with implementing AKMA features in 3GPP networks for devices that do not support such AKMA functionality.

DESCRIPTION OF EXAMPLE EMBODIMENTS

Overview

Figure 1:
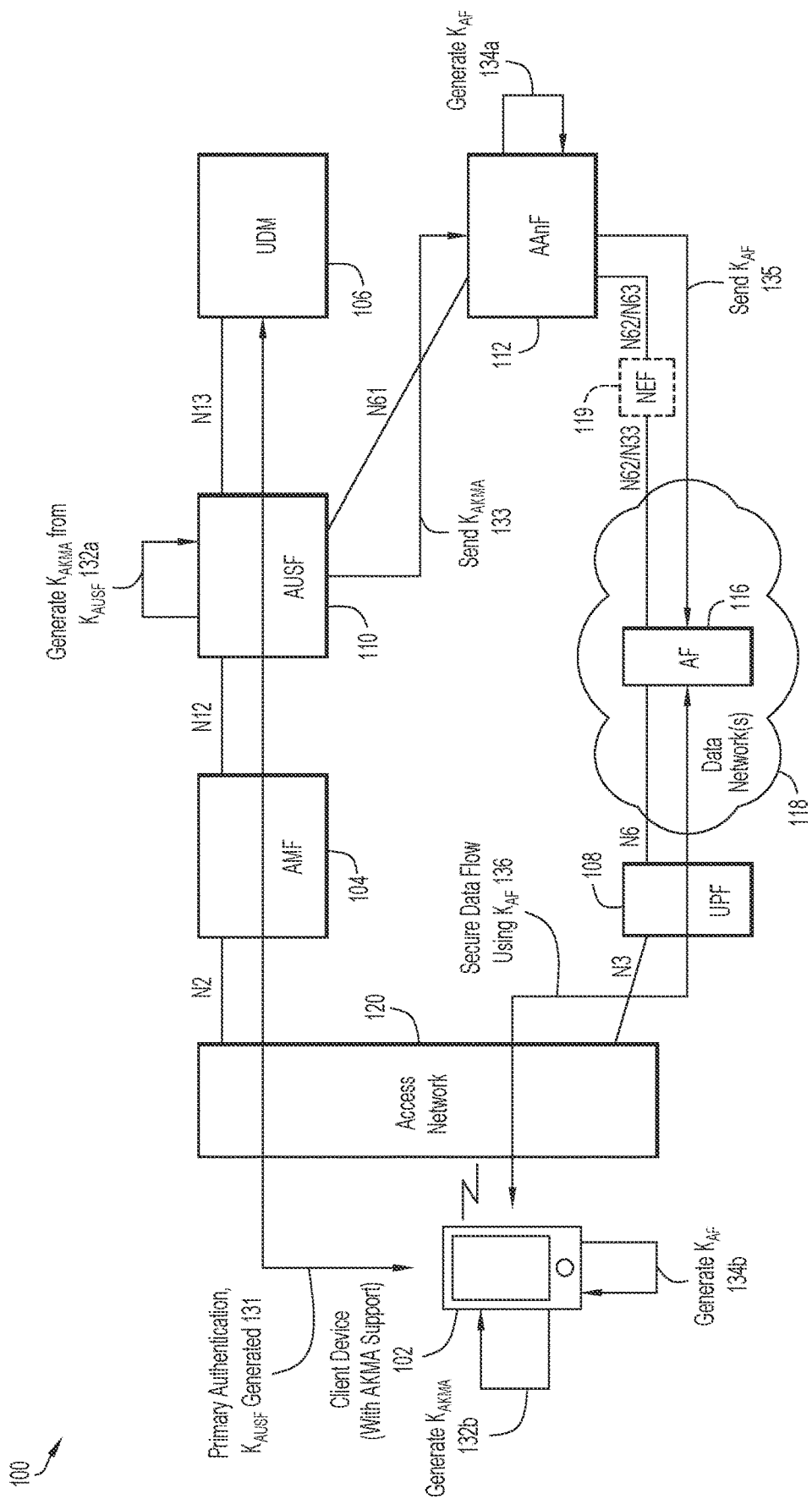
FIG. 1 is a block diagram of a system that illustrates example details associated with Authentication and Key Management for Applications (AKMA) operations involving a client device that supports AKMA functionality.

Presented herein are techniques to facilitate secure communications with an Application Function (AF) for a user equipment (UE) or client device that does not support Authentication and Key Management for Applications (AKMA) functionality. For example, techniques here provide for the ability to enable secure communications between an unmodified client device that does not support AKMA functionality and an Application Function that has AKMA support. The current 3GPP solution assumes both a client device and an Application Functions are to support the AKMA feature for end-to-end security; however, this would involve all 5G UEs/client devices to support the feature. It is unlikely that many 5G UEs/client devices will support AKMA functionality in the near future which would essentially deny such non-AKMA supporting US access to AKMA secured AFs. Techniques presented herein may enable client devices that do not support AKMA functionality to access/communicate with AFs that do support AKMA functionality without making any changes to such client devices and/or AFs.

In one instance, a computer-implemented method is provided that may include obtaining, by a user plane function, a first uplink data packet from a client device, wherein the first uplink data packet is to be communicated to an application; determining, by the user plane function based on the first uplink data packet, whether the client device supports an Authentication and Key Management for Applications (AKMA) functionality; based on determining that the client device does not support the AKMA functionality, buffering at least the first uplink data packet by the user plane function and determining whether the application supports the AKMA functionality; and based on determining that the application supports the AKMA functionality, performing AKMA functionality by the user plane function for the client device for data communications between the client device and the application.

In one instance, performing the AKMA functionality by the user plane function for the client device may include the user plane function establishing a session with the application for the client device to obtain an AKMA application key ($K_{AF}$) for the application. In one instance, performing the AKMA functionality by the user plane function for the client device may include the user plane function encrypting and communicating at least the first uplink data packet toward the application using the AKMA application key ($K_{AF}$) for the application. In one instance, performing the AKMA functionality by the user plane function for the client device may include the user plane function decrypting and communicating one or more downlink data packets toward the client device using the AKMA application key ($K_{AF}$) for the application.

Example Embodiments

AKMA is a new functionality that currently being studied by the Third Generation Partnership Project (3GPP) to support authentication and key management based on 3GPP credentials in a Fifth Generation (5G) system (5GS) in which such functionality can be used in conjunction with third-party applications and 3GPP services. AKMA is essentially an authentication and key distribution service through which access to an application server is based on the UE's cellular subscription. AKMA functionality is to support authentication and key management aspects for applications and 3GPP services, including Internet-of-Things (IoT) use cases based on 3GPP credentials in a 5G system. As referred to herein, the terms user equipment (UE) and client device may be used interchangeably.

FIG. 1 is a block diagram of a system 100 that illustrates example details associated with current AKMA operations involving a client device that does support AKMA functionality. System 100 illustrates an AKMA architecture that includes an Access and Mobility Management Function (AMF) 104, a Unified Data Management (UDM) 106 entity, a User Plane Function (UPF) 108, an Authentication Server Function (AUSF) 110, an AKMA Anchor Function (AAnF) 112, and an Application Function (AF) 116, which may be provided via one or more data network(s) 118. Also shown is an access network 120 and a client device 102 that, for system 100 of FIG. 1, is assumed to support AKMA functionality.

Generally, an AMF, such as of AMF 104, may facilitate access and mobility management control/services for one or more UEs/client devices, such as client device 102, for connection of the client device 102 with a mobile core network, which typically includes the AMF, a Session Management Function (SMF) (not shown), and a UPF, such as UPF 108. Generally, an SMF may be responsible for client device Protocol Data Unit (PDU) session management (SM), with individual functions/services being supported on a per-session basis in order to facilitate data transfer(s) between a client device and one or more data network(s) 118 (e.g., the Internet, the IP Multimedia Subsystem (IMS), an enterprise data network, etc.) via one or more UPFs. Generally, a UPF, such as UPF 108 may operate to provide packet routing and forwarding operations for user data traffic and may also perform a variety of functions such as packet inspection, traffic optimization, Quality of Service (QoS), policy enforcement and user data traffic handling (e.g., to/from one or more data networks), and billing operations (e.g., accounting, etc.) for client device 102 PDU sessions.

Typically, a UDM, such as the UDM 106, stores subscription data/information for subscribers (e.g., client device 102) that can be retrieved and/or otherwise obtained/utilized during operation. Generally, an AUSF, such as AUSF 110, facilitates primary authentication of a client device, such as client device 102, (e.g., via subscription information for the device contained within UDM 106) for registration of the client device within a mobile core network. For AKMA architectures, the AUSF 110 further provides an identifier for a client device, such as a Subscription Permanent Identifier (SUPI) and AKMA key material to the AAnF 112. An AAnF, such as AAnF 112, is a new network function (NF) that is proposed by 3GPP standards, such as 3GPP Technical Specification (TS) 33.501 and TS 33.535, to provide key management services/operations in the AKMA architecture.

Generally, an AF, such as AF 116, may be any function, service, and/or the like provided via one or more data network(s) 118 that may provide one or more services for a UE/client device, such as an IMS service (e.g., for Voice over IP (VoIP) calls), third-party services (e.g., streaming video, social networking, online collaboration etc.), Time Sensitive Networking (TSN) services, combinations thereof, and/or the like.

Generally, an access network, such as access network 120 may be any Radio Access Network (RAN) may include any combination of one or more 3GPP 5G/nG g Node Bs (gNodeB or gNB) (not shown) and/or 3GPP 4G/LTE evolved node Bs (eNodeBs or eNBs), not shown, to facilitate network connectivity between client device 102 and various network elements of system 100, (e.g., AMF 104, UPF 108, etc.). A gNodeB/eNodeB may implement a wireless wide area (WWA) (e.g., cellular) air interface and, in some instances also a wireless local area (e.g., Wi-Fi®) air interface, for any combination of Radio Access Technology (RAT) types (sometimes referred to more generally as 'accesses') for access network 120 such as, 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like. Thus, an access network, including any combination of gNodeBs/eNodeBs, may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more client devices, such as client device 202, may utilize to connect to access network 120 for one or more sessions (e.g., voice, video, data, gaming, combinations thereof, etc.) with a mobile core network.

A client device, such as client device 102, may be associated with any user, subscriber, employee, client, customer, electronic device, etc. wishing to initiate a flow in a mobile network environment and may be inclusive of any device that initiates a communication in such an environment, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks.

As illustrated in FIG. 1, the client device 102 may interface with access network 120 via one or more over-the-air RF connections. The access network 120 may further interface with AMF 104 via a 3GPP N2 interface. The access network 120 may further interface with UPF 108 via a 3GPP N3 interface. The UPF 108 may further interface with AF 116 via a 3GPP N6 interface. As prescribed by 3GPP TS 33.535, the AMF 104 may further interface with AUSF 110 via a 3GPP N12 interface and the AUSF 110 may further interface with UDM via an N13 interface and with AAnF 112 via a 3GPP N61 interface.

Depending on whether the AF 116 is implemented/operated/owned by a core network operator/service provider (SP) that also owns/operates AMF 104, AUSF 110, UPF 108, AAnF 112, etc. (in which the AF 116 is considered to be an 'internal' AF 116) or is implemented/owned/operated by a third party that is not the core network operator/SP (in which the AF 116 is considered to be an 'external' AF 116), the AAnF 112 may interface with AF 116 via a 3GPP N62 interface (for instances in which the AF 116 is an internal AF 116 that is owned/operated by the mobile core network/SP) or may interface with a Network Exposure Function (NEF) 119 via a 3GPP N63 interface and the NEF 119 may interface with the AF 116 via a 3GPP N33 interface (for instances in which the AF 116 is an external AF 116 that is not owned/operated by the core network operator/SP). Generally, the NEF 119 acts as an intermediary to facilitate communications between the AAnF 112 and the AF 116 when the AF 116 is an external AF 116.

Consider various operations that may be performed within system 100 for the client device 102 that supports AKMA functionality, as prescribed at least by 3GPP TS 33.501 and TS 33.535. As illustrated in FIG. 1, as part of primary authentication for the client device 102 an AUSF key ($K_{AUSF}$) is derived/generated through primary authentication of client device 102, as shown at 131. In some instances, the $K_{AUSF}$ can be generated by the UDM 106, such as for instances involving Extensible Authentication Protocol (EAP) Authentication and Key Agreement (AKA) authentication (as prescribed at least by Internet Engineering Task Force (IETF) Request For Comments (RFC) 4187) for the client device 102 In some instances, the $K_{AUSF}$ can be generated by the AUSF 110, such as for instances involving EAP improved AKA (AKA') authentication (as prescribed at least by IETF RFC 5448) for the client device 102. The $K_{AUSF}$ is stored by the AUSF 110 and is used for Non-Access Stratum (NAS) and Access Stratum (AS) security (encryption and integrity) for client device 102 communications and also for subsequent generation of other security keys.

For example, an AKMA Key ($K_{AKMA}$) (also referred to as an AKMA Anchor Key) for client device 102 is derived/generated from the $K_{AUSF}$ as part of the primary authentication of the client device by the AUSF 110. The client device and the AUSF 110 both generate the $K_{AKMA}$ (e.g., $K_{AKMA}$ generated by AUSF 110, as shown at 132a, and $K_{AKMA}$ generated by client device 102, as shown at 132b). Upon generation of the $K_{AKMA}$ by the AUSF 110, the AUSF 110 sends the $K_{AKMA}$ to the AAnF 112, as shown at 133. Thereafter, when the client device 102 and the AF 116 seek to establish secure communications for uplink (UL)/downlink (DL) data packets that are to be exchanged between the client device 102 and the AF 116, the client device 102 and the AAnF 112 both generate an AKMA Application Function Key (also referred to as AKMA Application Key) ($K_{AF}$) (e.g., $K_{AF}$ generated by AAnF 112, as shown at 134a, and $K_{AF}$ generated by client device 102, as shown at 134b using standards-based procedures as defined per 3GPP TS 33.535 involving a $K_{AF}$ derivation function (KDF) (not shown) provided for each of AAnF 112 and client device 102). As shown at 135, the AAnF 112 sends the $K_{AF}$ to the AF 116. Thereafter, the $K_{AF}$ is used by the client device 102 and the AF 116 to facilitate secure data exchanges between the client device 102 and the AF 116, as shown at 136.

For example, the client device 102 can encrypt UL data packets sent toward the AF 116 using the $K_{AF}$ and, upon reception of the UL data packets, the AF 116 can decrypt the packets using the $K_{AF}$. In the opposite direction, the AF 116 can encrypt DL data packets sent toward the client device 102 using the $K_{AF}$ and, upon reception of the DL data packets, the client device 102 can decrypt the data packets using the $K_{AF}$. The encryption/decryption using the $K_{AF}$ can be performed using standards-based operations, as prescribed at least by 3GPP TS 33.535.

3GPP is currently studying a new reference point or interface, referred to as the 'UA*' interface, between a UE/client device and an AF that is to support the AKMA protocol for communications/operations between client devices and AFs. For example, according to current 3GPP standards, such as 3GPP TS 33.501 and TS 33.535, a client device is to indicate AKMA parameters, such as an AKMA Key Identifier (A-KID) on the UA* interface to an AF, such that the AF can use the A-KID parameter to identify and fetch key material for the client device (e.g., the $K_{AKMA}$ associated with the authenticated client device) from the AANF. When a client device does not indicate an A-KID in a first data packet to an AF, the AF may indicate to the client device to send the A-KID if the AF supports AKMA functionality.

To avail the advantages of security provided by AKMA, a client device is to support AKMA functionality in accordance with standards proposed by 3GPP. Many applications may have their own inbuilt security mechanism and, when such applications connect to AF on the N6 side (i.e., the interface between a UPF and a data network in which the AF is implemented); such applications can use these inbuilt security mechanisms for establishing a secure channel with the AF.

However, it is very likely that a majority of client devices that may be used in a 5G network environment will not have/support AKMA functionality in the near future. Client devices that do not have AKMA functionality can result in various problems, such as, for example:

1. Client devices that do not support AKMA functionality may not be able to obtain service from Application Functions/Services that support only AKMA;
2. Application Functions/Servers will likely need to support both AKMA and client device application specific security mechanisms; and/or
3. There may be many Application Functions/Services provided by a mobile network operator that the operator may not be able to monetize for client devices that do not support AKMA functionality.

Additionally, there are many services owned/operated by enterprises, such as video conferencing/collaboration services, in which an enterprise may desire to use AKMA functionality with such services. However, not having support in client devices for AKMA functionality may limit such client devices from availing/utilizing such AKMA-based services that an enterprise desires to utilize. Likewise, many new content providers may not be able to deliver services on 5G devices that do not support AKMA functionality.

Moreover, in IoT scenarios, a session key known by a client device and an application server is utilized to ensure the integrity and confidentiality of user data. While application functions/servers can be upgraded to support AKMA functionality, it is can be huge task to upgrade large quantities of IoT devices to support such AKMA functionality.

Thus, there is a clear gap between 3GPP standards being developed and devices that do not currently support AKMA functionality. Accordingly, techniques are presented herein to facilitate secure communications with an AF for a client device that or does not have AKMA functionality and/or does not support AKMA functionality.

Figure 2A:
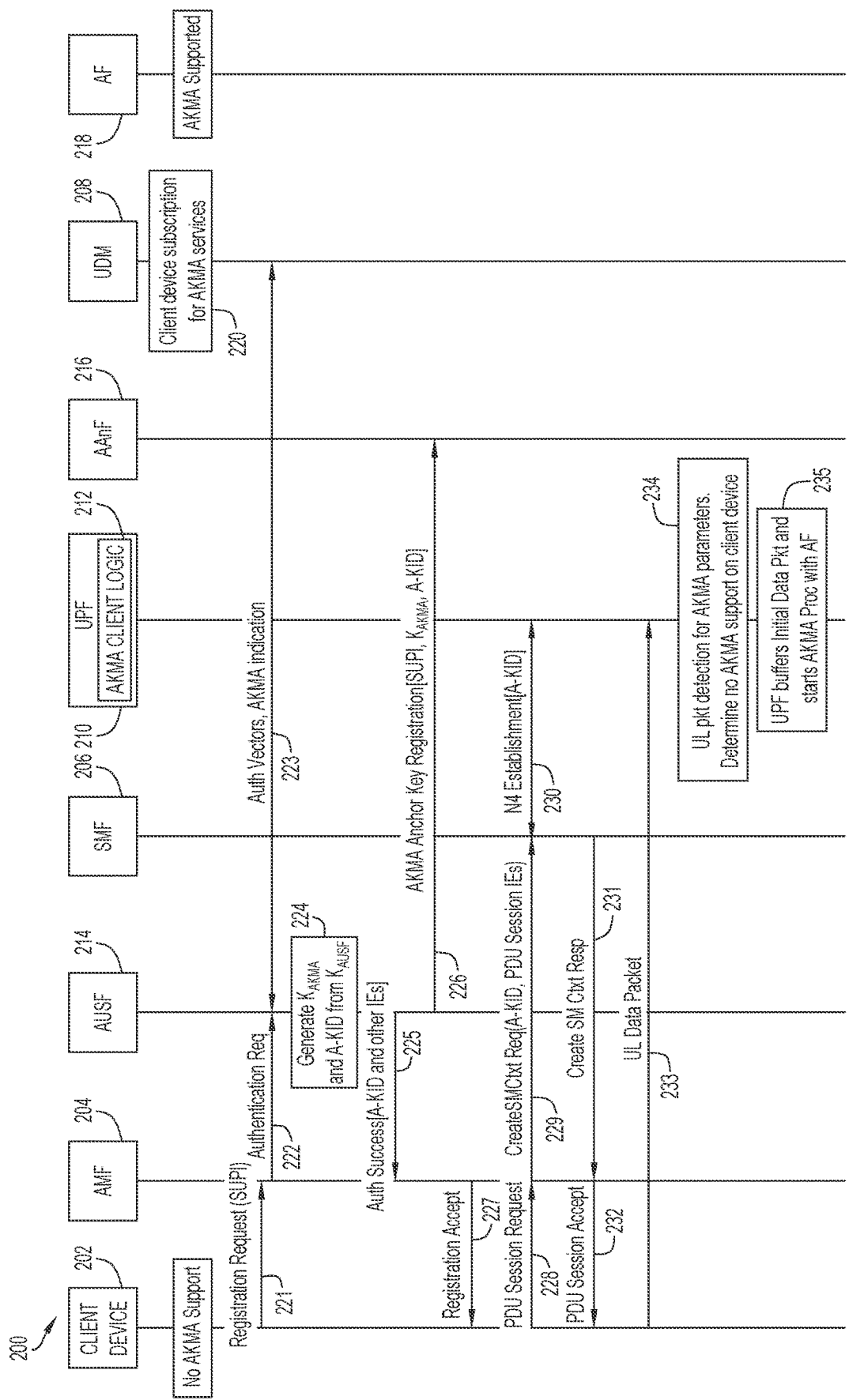
FIGS. 2A, 2B, and 2C are a message sequence diagram illustrating a call flow associated with facilitating secure communications with an Application Function (AF) for a client device that does not support AKMA functionality, according to an example embodiment.
Figure 2B:
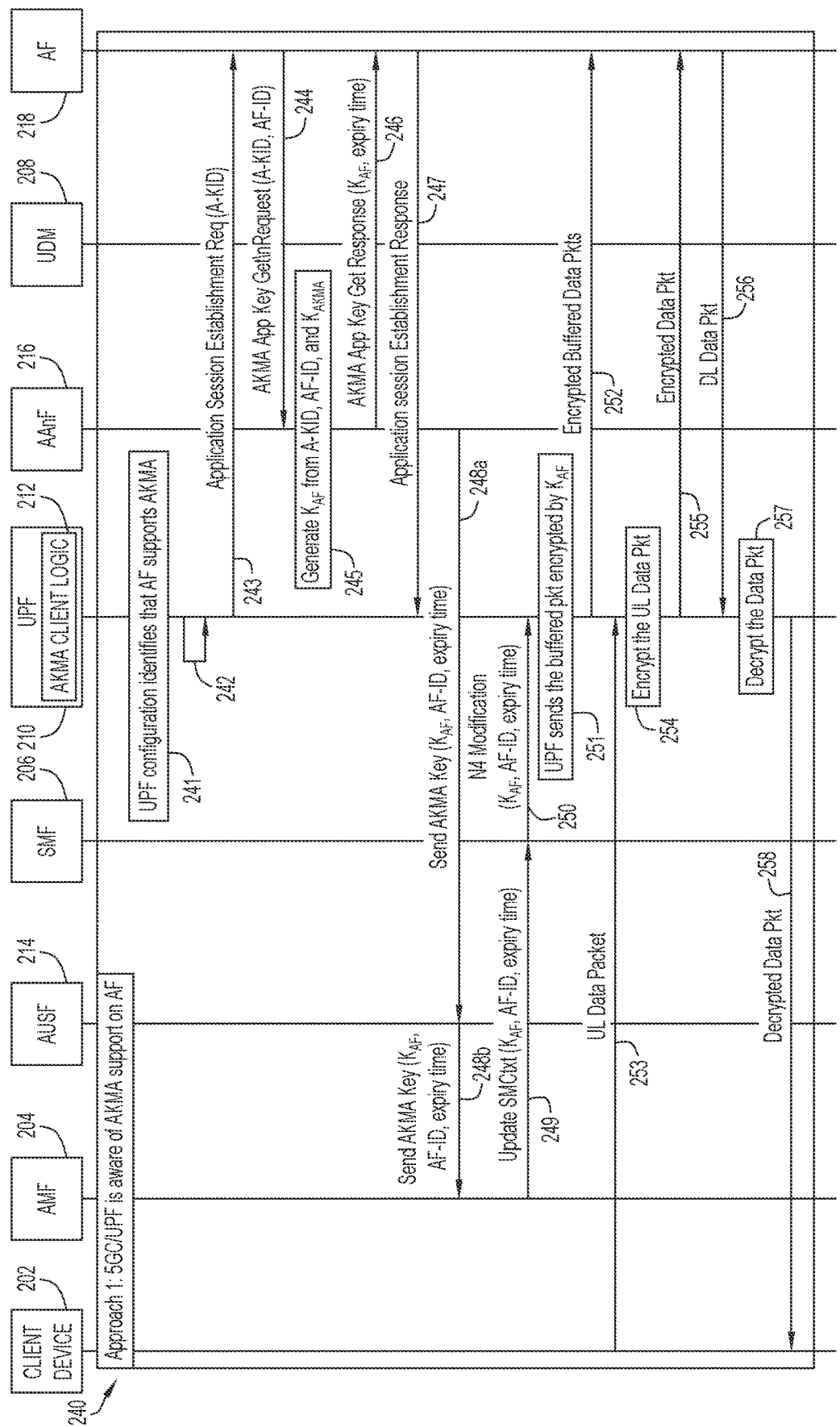
Figure 2C:
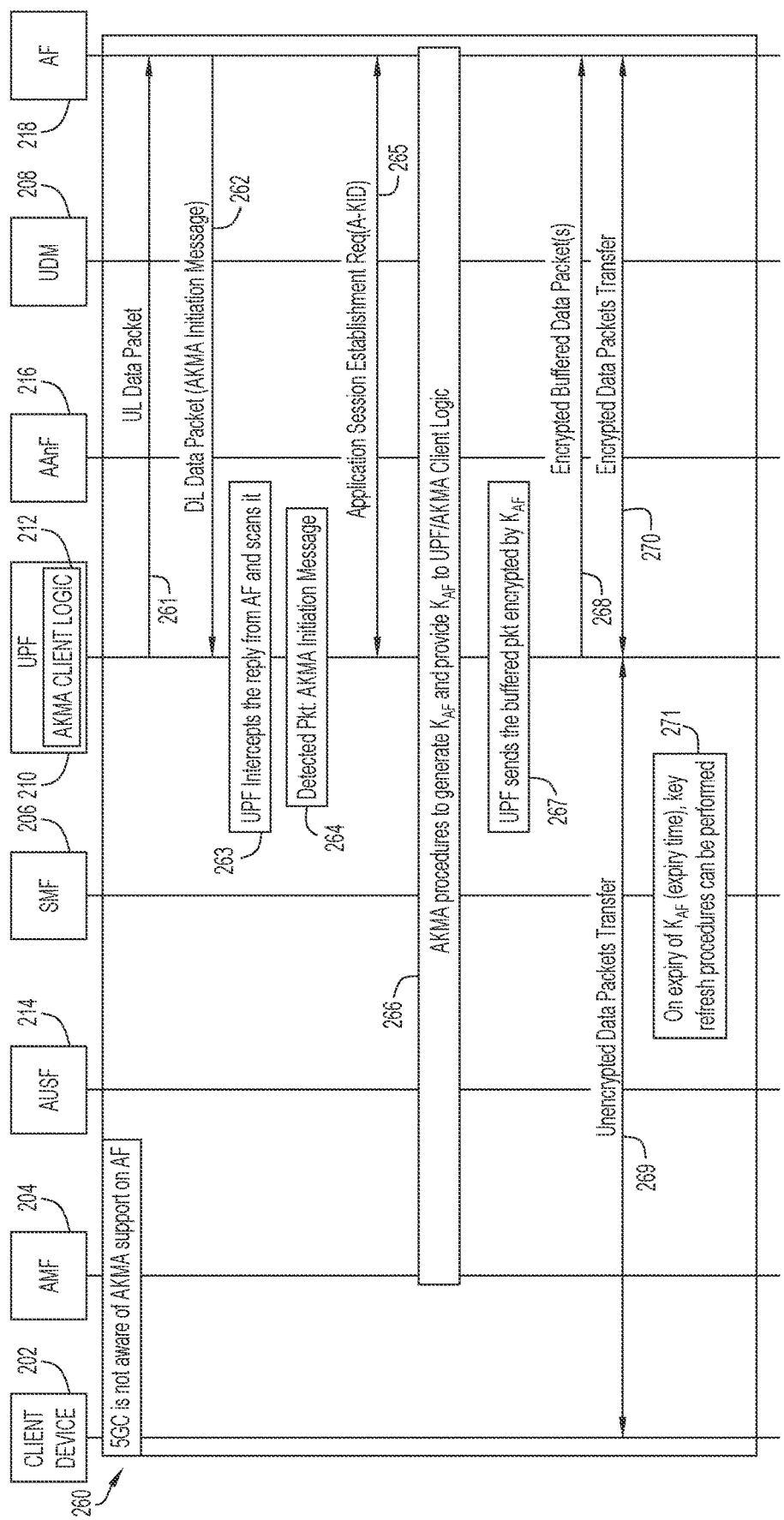

Referring to FIGS. 2A, 2B, and 2C, FIGS. 2A, 2B, and 2C are a message sequence diagram illustrating a call flow 200 associated with facilitating secure communications with an AF for a client device that does not support AKMA functionality, according to an example embodiment. As illustrated, call flow 200 includes a client device 202 that does not support AKMA functionality and an AF 218 that does support AKMA functionality. Also shown in call flow 200 is an AMF 204, an SMF 206, a UDM 208, a UPF 210 that is enhanced to include AKMA client logic 212, an AUSF 214, and an AAnF 216.

In order to facilitate techniques for various embodiments herein to facilitate secure communications for a client device that does not support AKMA functionality, such as client device 202, UPF 210 can be enhanced with AKMA client logic 212 that is configured to perform AKMA functions on behalf of or for one or more client devices that do not currently support AKMA functionality (e.g., client device 202).

Broadly during operation, as discussed in further detail herein, the AKMA client logic 212 provided for the UPF 210 will simulate AKMA functionality for the client device 202 and will receive the $K_{AKMA}$ for the client device 202 from the AUSF 214/AAnF 216. When the client device 202 initiates data communications with the AF 218 (e.g., the client device sends an initial UL data packet towards the AF 218), the UPF 210 via AKMA client logic 212 is to determine whether or not the client device 202 supports AKMA functionality and is to determine whether the AF 218 support AKMA functionality before activating simulated client device AKMA operations (e.g., encrypting/decrypting packets) for data exchanges between the client device 202 and the AF 218.

For example, before activating the simulated client device AKMA operations, the UPF 210 via AKMA client logic 212 is to determine, based on the initial UL data packet, whether the client device 202 supports the AKMA functionality. In one instance, the UPF 210 via AKMA client logic 212 can determine that the client device 202 does not support the AKMA functionality by determining that the initial UL data packet does not include an AKMA header including an AKMA Key Identifier (A-KID) that identifies the $K_{AKMA}$ for the client device 202. Based on determining that the client device 202 does not support the AKMA functionality, the UPF 210 via AKMA client logic 212 can buffer at least the initial UL data packet (and potentially additional UL data packets sent by the client device 202) and determine whether the AF 218 supports the AKMA functionality. Based on determining the client device 202 does not support the AKMA functionality and that the AF 218 does support the AKMA functionality, the UPF 210 via the AKMA client logic 212 can perform AKMA functionality for the client device 202 for data communications between the client device 202 and the AF 218, which can include establishing a secure channel with the AF 218 utilizing the $K_{AF}$ in which data exchanges between the client device 202 and the AF can be secured (e.g., encrypted) using the $K_{AF}$. For example, the secure channel can be established using an application session establishment request/response exchange such that the data exchanges between the client device 202 and the AF 218 can be secured by the UPF 210/AKMA client logic 212 encrypting UL data packets (including the initial UL data packets) sent by the client device 202 toward the AF 218 using the $K_{AF}$ generated for the AF 218 and also decrypting DL data packets sent by the AF 218 toward the client device 202 using the $K_{AF}$.

Consider various additional operational details discussed below with reference to call flow 200 in which two approaches are illustrated for facilitating secure communications for the client device 202 that does not support the AKMA functionality.

A first approach, as shown in FIG. 2B via operations 240 illustrates example operations that may be utilized for instances in which the 5G core (5GC)/UPF 210 knows, prior to attempting an application session establishment with AF 218, that AF 218 supports the AKMA functionality. Operations involving the first approach illustrated in FIG. 2B may be utilized in instances in which a given AF (e.g., AF 218) is owned/operated by a core network operator/service provider (SP) that also owns/operates the mobile network (e.g., collectively owns/operates the AMF 204, SMF 206, UDM 208, UPF 210, AUSF 214, and the AAnF 216 such that AF 218 is considered to be an 'internal' AF 218).

A second approach, as shown in FIG. 2C via operations 260 illustrates example operations that may be utilized for instances in which the 5GC/UPF 210 does not know, prior to attempting an application session establishment with the AF 218, whether the AF 218 supports AKMA functionality. Operations involving the second approach illustrated in FIG. 2C may be utilized for instances in which a given AF (e.g., AF 218) is owned/operated by a third-party that is not the core network operator/SP such that AF is considered to be an 'external' AF 218.

With reference to call flow 200, consider various operations/example details that may be involved for both the first and the second approaches. Although not illustrated in FIGS. 2A-2C, it is to be understood that communications between the client device 202 and various network elements, such as AMF 204 and UPF 210 can be facilitated via any suitable RAN.

As shown at 220, consider that UDM 208 is configured with a subscription for client device 202 that identifies that the client device has a subscription for AKMA services (e.g., secure communications are to be provided for client device 202 utilizing AKMA).

As shown at 221, consider that client device 202 sends a Registration Request message to AMF 204 that includes the SUPI for client device 221. In some instances, client device 202 can send a Subscription Concealed Identifier (SUCI), which the AMF 204/UDM 208 can de-conceal to obtain the SUPI for the client device 202. Continuing with the present example, reception of the Registration Request triggers AMF 204 to send, an Authentication Request message to AUSF 214, as shown at 222, including the SUPI for client device 202. Reception of the Authentication Request triggers AUSF 214 to perform a primary authentication for client device 202, which includes, as shown at 223, the AUSF 214 obtaining authentication (auth) vectors and the AKMA indication from UDM 208 that indicates, based on the subscription for client device 202, that the client device is subscribed for AKMA services. Per-3GPP TS 33.501, the authentication vectors include authentication data such as 'AUTN' (an authentication token), 'RAND' (a random challenge), and 'XRES*' (an expected response to the challenge), and also the $K_{AUSF}$ (which can be derived by either the UDM 208 per EAP-AKA or by the AUSF 214 per EAP-AKA').

After the client device 202 registers to the network, based on the subscription information for the client device 202 obtained from the UDM 208 at 223, the AUSF 214 will AKMA key material for client device 202 including the $K_{AKMA}$ and the A-KID that identifies the $K_{AKMA}$ from the $K_{AUSF}$ generated for the client device 202 (potentially including generation of the $K_{AUSF}$, as noted above), as shown at 224.

Following generation of the AKMA key material, the AUSF 214 generates and sends an Authentication Success message to the AMF 204 that includes the A-KID and other information elements (IEs), as shown at 225. Other IEs may include, the SUPI for client device 202 and a Security Anchor Function (SEAF) key ($K_{SEAF}$) in which the $K_{SEAF}$ is also derived from the $K_{AUSF}$ per RFC 4187 or RFC 5448. As shown at 226, the AUSF 214 performs an AKMA Anchor Key Registration with the AAnF 216 in which the SUPI, the $K_{AKMA}$, and the A-KID are provided to the AAnF 216, which the AAnF 216 stores. At 227, a Registration Accept message is communicated to the client device 202 from the AMF 204.

As shown at 228, the client device 202 initiates establishment of a PDU session establishment by communicating a PDU Session Request message to the AMF 204. During PDU session establishment for the client device 202, the AMF 204 send the A-KID to the UPF 210 via the SMF 206 over the N4 interface (not shown), which interconnects the SMF 206 and the UPF 210. For example, as shown at 229, the AMF 204 sends a Create Session Management Context Request [CreateSMCtxt Req] message to the SMF 206 that includes the A-KID and PDU session IEs (e.g., data network name (DNN), Single Network Slice Selection Assistance Information (S-NSSAI), SUPI, AMF ID, N1 SM container, etc. as prescribed by 3GPP standards), which triggers the SMF 206 to establish an N4 session with the UPF 210, as shown at 230, in which the N4 session establishment included providing the A-KID to the UPF 210. Upon successful session establishment, the SMF 206 responds to the AMF 204, as shown at 231, with a Create SM Context Response [CreateSMCtxt Resp], which triggers the AMF 204 to send a PDU Session Accept message to the client device 202, as shown at 232.

Consider, as shown at 233, that client device 202 sends an initial (first) UL data packet towards AF 218. When the client device 202 sends first data packet, the UPF 210 via AKMA client logic 212 will perform packet detection to determine if there are AKMA parameters sent by the client device 202 in the UL data packet, as shown at 234. If the client device 202 supports AKMA functionality, an AKMA header is to be included in the UL data packet that includes the A-KID and potentially other AKMA parameters.

Thus, the UPF 210 via AKMA client logic 212 can determine at 234 whether the client device 202 does or does not support AKMA functionality by determining whether the A-KID is present within an AKMA header of the initial UL data packet send by the client device. If the AKMA parameters including the A-KID are sent by the client device 202, the UPF 210 can deactivate the AKMA client logic 212 from performing AKMA functionality on behalf of/for the client device 202, as the client device 202 is determined to already support the AKMA functionality. However, when there are no AKMA parameters (A-KID) found in the initial UL data packet, the UPF 210 can activate the AKMA client logic 212 to perform AKMA functionality on behalf of/for the client device 202.

For the current use case, consider that the UPF 210 via AKMA client logic 212 determines that there is no AKMA support on the client device 202 due to no A-KID being included in an AKMA header of the initial UL data packet. Based on the determination at 234 that the client device 202 does not support AKMA functionality, the UPF 210 via AKMA client logic 212 is activated to perform AKMA functionality on behalf of/for client device 202, which includes, as shown at 235, the UPF 210 via AKMA client logic buffering the initial UL data packet obtained from the client device 202 and beginning an AKMA process with AF 218, as discussed below with reference to FIG. 2B or 2C.

Either operations 240 as shown in FIG. 2B can be performed for a first approach for instances in which the UPF 210/AKMA client logic 212 knows that AKMA is supported on AF 218 or operations 260 as shown in FIG. 2C can be performed for a second approach for instances in which the UPF 210/AKMA client logic 212 does not know whether AKMA is supported on AF 218.

For the first approach for instances in which the UPF 210/AKMA client logic 212 knows that AKMA is supported on AF 218, consider example operations 240 as illustrated in FIG. 2B. For the first approach, consider at 241 that the UPF 210 is provided a configuration that identifies that AF 218 supports AKMA functionality. In one embodiment, the configuration at 241 may be a table, database, or the like that includes an Application Identifier for AF 218 (AF-ID) and a flag or other setting that indicates that AF 218 supports AKMA functionality. As shown at 242, UPF 210 via AKMA client logic 212 can query the configuration to determine that AF 218 supports the AKMA functionality.

Upon determining that the AF 218 supports the AKMA functionality, the UPF 210 via the AKMA client logic 212 initiates an application session establishment with the AF 218 using AKMA parameters for the client device 202, such as the A-KID, in which the UPF 210 via the AKMA client logic 212 communicates an Application Session Establishment Request message to the AF 218, as shown at 243, that includes the A-KID.

In some instances, the UPF 210 via AKMA client logic 212 can query the A-KID from the AMF 204 via the SMF 206 (e.g., via the 3GPP N4 interface interconnecting the UPF 210 and the SMF 206 and the 3GPP N11 interface (not shown) interconnecting the SMF 206 and the AMF 204). However, in some instances, for example, as illustrated for the embodiment of FIGS. 2A-2C, the A-KID can be provided to the UPF 210 via the N4 session establishment, as shown at 230, as discussed above.

As shown at 244, the AF 218 will use the A-KID to query the AAnF 216 for the AKMA Application key ($K_{AF}$) by supplying its Application ID (AF-ID) and the A-KID to the AAnF 216 via an AKMA Application Key Get Request message. As shown at 245, the AAnF 216 generates additional AKMA key material for the application session, including the AKMA Application key ($K_{AF}$) and an expiry time for the $K_{AF}$, typically referred to as '$K_{AF}$exptime'. Following expiration of the expiry time, new key material is to be generated. Following generation of the key material, the AAnF 216 sends the key material ($K_{AF}$ and expiry time) to the AF 218 via an AKMA Application Key Get Response message, as shown at 246. Upon obtaining the key material, the AF 218 provides an Application Session Establishment to the UPF 210, as shown at 247, indicating establishment of the secure channel/session with the AF 218.

Recall, under normal AKMA operations for a client device that supports AKMA functionality, the client device also generates the $K_{AF}$. However, for embodiments herein in which UPF 210 via AKMA client logic 212 is to perform AKMA functionality for client device 202, the UPF 210/AKMA client logic 212 is to also obtain the $K_{AF}$ for the application session established with AF 218 in order to encrypt/decrypt data packets on behalf of the client device 202.

Thus, in order to perform AKMA functionality on behalf of client device 202 by the UPF 210/AKMA client logic 212, the AAnF will also provide the AKMA key material including the AF-ID, the $K_{AF}$, and the expiry time to the AUSF 214, as shown at 248*a*, in which the AUSF 214 further provides the key material to the AMF 204, as shown at 248*b*. Thereafter, AMF 204 communicates the key material to the UPF 210/AKMA client logic 212 via the SMF 206. For example, AMF 204 can send an Update SM Context message [UpdateSMCtxt] to SMF 206, as shown at 249 that includes the key material ($K_{AF}$, AF-ID, and expiry time), which triggers the SMF 206 to send an N4 Modification message to the UPF 210, as shown at 250, that also includes the key material.

Upon obtaining the key material, the UPF 210 via AKMA client logic 212 can encrypt at least the initial UL data packet that was buffered at 235 (and any other buffered UL data packet(s) obtained from the client device 202) using the $K_{AF}$, as shown at 251, and can send the encrypted buffered UL data packet(s) toward the AF 218, shown at 252.

Subsequently, as shown at 253, 254, and 255 all UL data packets received from client device 202 will be encrypted by the UPF 210/AKMA client logic 212 using the $K_{AF}$ and sent towards the AF 218 and, as shown at 256, 257, and 258, all DL data packets for the client device 202 received from the AF 218 will be decrypted by the UPF 210/AKMA client logic 212 using the $K_{AF}$ and sent towards the client device 202.

Turning to the second approach for instances in which the UPF 210/AKMA client logic 212 does not know whether AF 218 supports AKMA functionality, consider operations 260 as illustrated in FIG. 2C. For the second approach when the UPF 210/AKMA client logic 212 does not know whether AF 218 supports AKMA key functionality, the UPF 210 via AKMA client logic 212 sends, as shown at 261, the initial UL data packet obtained from the client device 202 at 233 to the AF 218 in the same format as it was received from the client device 202 (e.g., as-is), in addition to also buffering the packet (as noted at 235).

For instances in which the AF 218 supports and is to utilize AKMA packet encryption, the AF 218 will send a reply response by sending a DL data packet towards the client device 202 that includes an AKMA Initiation message, as shown at 262. As shown at 263, the UPF 210/AKMA client logic 212 will intercept the packet and determine if it contains the AKMA Initiation message. If the AKMA indication (AKMA Initiation message) is present in the DL data packet and the UPF 210/AKMA client logic 212 has determined that the client device 202 does not support AKMA functionality (i.e., as discussed at 234), the UPF 210 via the AKMA client logic 212 will send the AKMA parameters (A-KID) to the AF 218.

For example, for the embodiment of FIG. 2C, consider that UPF 210 via AKMA client logic 212 detects the presence of the AKMA Initiation message in the DL data packet, as shown at 264, and thereafter sends initiates establishment of a secure channel with AF 218 by sending an Application Session Establishment Request message to the AF that includes the A-KID, as shown at 265. Thereafter, as generally shown at 266, various operations can be performed between the AF 218 and the AAnF 216 to generate the $K_{AF}$ and establish the application session with UPF 210/AKMA client logic 212 (e.g., operations as discussed above at 244, 245, 246, and 247), as well as to provide the $K_{AF}$, the AF-ID for AF 218, and the expiry time to the UPF/AKMA client logic 212 via operations involving the AUSF 214, AMF 204, and SMF 206 (e.g., operations as discussed above at 248a/248b, 249, and 250).

Upon obtaining the key material, the UPF 210 via AKMA client logic 212 can encrypt at least the initial UL data packet that was buffered at 235 (and any other buffered UL data packet(s) obtained from the client device 202) using the $K_{AF}$, as shown at 267, and can send the encrypted buffered UL data packet(s) toward the AF 218, shown at 268. Subsequently, as shown at 269 and 270 all UL data packets received from client device 202 will be encrypted by the UPF 210/AKMA client logic 212 using the $K_{AF}$ and sent towards the AF 218 and all DL data packets for the client device 202 received from the AF 218 will be decrypted by the UPF 210/AKMA client logic 212 using the $K_{AF}$ and sent towards the client device 202.

Both the first and second approaches can support key refresh operations. For example, an expiry time is associated with the security keys, such as an expiry time for $K_{AF}$. In some instances, the UPF 210/AKMA client logic can maintain the expiry time for the AKMA keys (e.g., $K_{AF}$), can run a timer based on the expiry time, and, on expiration of the timer, can trigger key regeneration by requesting a new key, $K_{AF}$, or potentially a set of keys, depending on future implementations (e.g., from the AUSF 214 or from the AAnF 216). The expiry time may represent any period of time (e.g., in seconds, hours, days, etc.). In some instances, as shown at 271, the AUSF 214 can trigger key refresh procedures on expiry of the $K_{AF}$ (e.g., expiration of the expiry time) in order to generate a new $K_{AF}$. In still some instances, the AAnF 216 can send a new key, $K_{AF}$, or potentially a set of keys depending on future implementations, to the AKMA client logic 212 in the UPF 210 via the AUSF 214/AMF 204/SMF 206 path on key expiry.

For instances in which the IP anchor/PDU session anchor (PSA), such as UPF 210 changes, the IP address of the client device 202 can change, which can trigger new secure channel establishment utilizing the techniques illustrates in FIGS. 2A-2C. The UPF for a client device can change for multiple reasons, such as client device session mobility (e.g., for different Session and Service Continuity (SSC) types), UPF failure, network congestions, and/or the like. Different SSC types can include SSC Type 1, which indicates that, during registration, a UE IP address is not to be changed; SSC Type 2, which indicates that a UE IP address can be changed and that a new IP connection for the UE is to be created after removing a previous/existing IP connection for the UE; and SSC Type 3, which indicates that a UE IP address can be changed and that a new IP connection for the UE is to be created before removing a previous/existing IP connection for the UE.

In some instances, multiple UPFs may be chained together for splitting different roles/services among the UPFs. When multiple UPFs are implemented in a deployment (not shown in FIGS. 2A-2C), the UPF terminating the N6 tunnel (towards a data network/AF) is referred to as the PSA-UPF, while other chained UPFs are referred to as Intermediate UPFs (I-UPFs). Such a deployment may be useful for breaking a large monolithic UPF into smaller, micro-UPFs that can be chained together. As AKMA involves security on the N6 side, I-UPFs may not be impacted by techniques described herein, whereas the last UPF in the chain (e.g., the PSA-UPF) can establish the secure channel with the AF utilizing techniques as illustrated in FIGS. 2A-2C).

Accordingly, techniques herein can allow UEs/client devices that do not support AKMA functionality to utilize 5G AKMA applications/services. 5GC UPFs can be enhanced with AKMA client logic, such as UPF 210 enhanced with AKMA client logic 212, to facilitate operations described herein without making/involving changes to either UEs/client devices or AFs. The AKMA client logic 212 configured for the UPF 210 can provide the determination of AKMA support for both UEs/client devices and AFs in order to activate further AKMA functionality to facilitate the AKMA operations as discussed for embodiments herein to facilitate secure client device/AF communications based on determining both that a given client device does not support AKMA functionality and determining that a given AF with which the client device initiates communication does support AKMA functionality. Further, the AKMA client logic 212 configured for the UPF 210 can perform interactions with other network functions in order to fetch security key material from key generation functions (e.g., AUSF 214 and AAnF 216).

Figure 3:
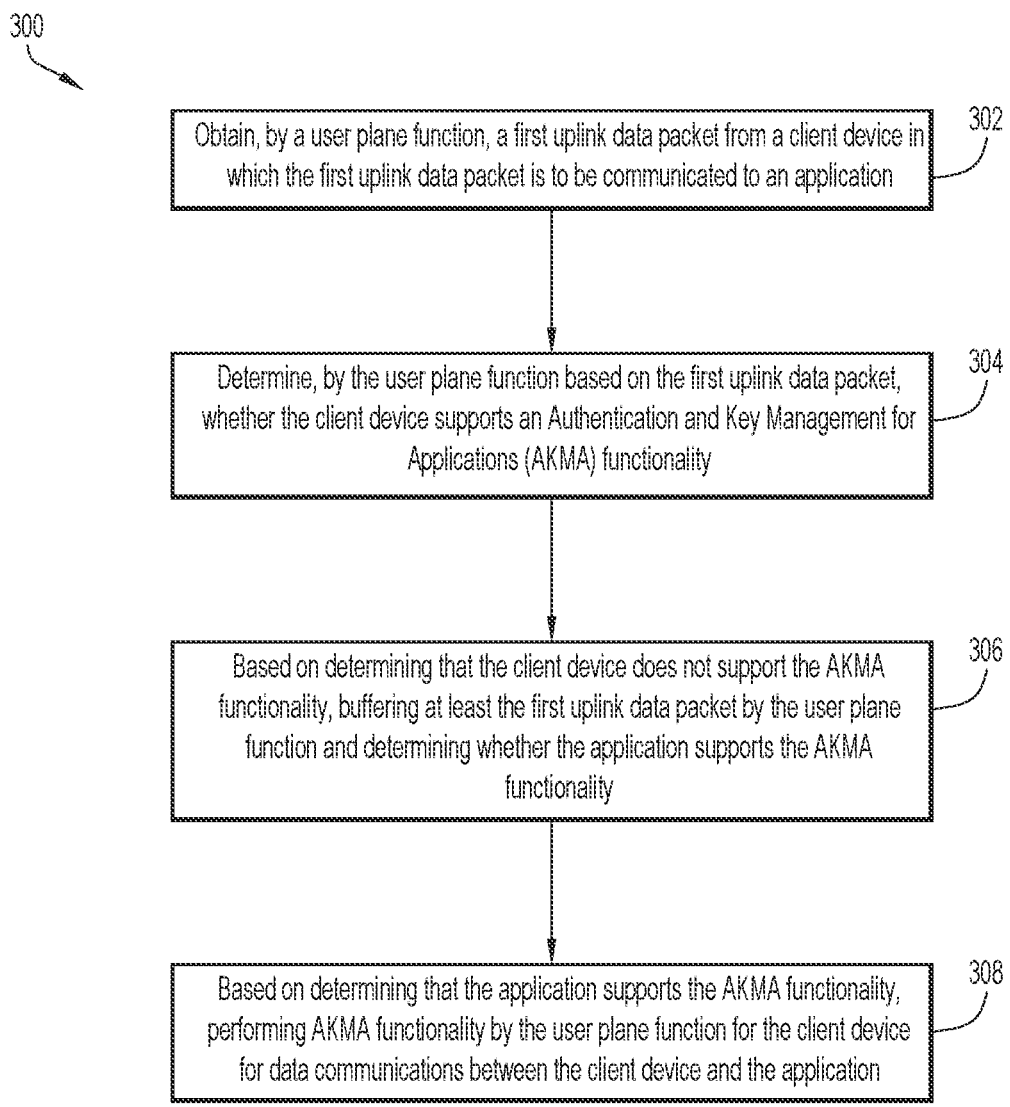
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, UPF that is enhanced with AKMA client logic, such as UPF 210 including AKMA client logic 212, in order to facilitate secure communications with an AF for a client device that does not support AKMA functionality, such as client device 202 that does not support AKMA functionality, according to an example embodiment.

As shown at 302, the method may include obtaining, by a user plane function (e.g., UPF 210/AKMA client logic 212), a first uplink data packet from a client device (e.g., client device 202) in which the first uplink data packet is to be communicated to an application (e.g., AF 218).

At 304, the method may include determining, by the user plane function based on the first uplink data packet, whether the client device supports an Authentication and Key Management for Applications (AKMA) functionality. In one instance, determining that the client device does not support the AKMA functionality may include the user plane function determining that the first uplink data packet does not include an AKMA key identifier (A-KID) for the client device (e.g., as shown at 234 for FIG. 2A). In one instance, the A-KID can be obtained by the user plane function prior to obtaining the first uplink data packet (e.g., from SMF 206 via N4 session establishment, as shown at 230). In some instances, the user plane function can query the A-KID from an AMF via the SMF with which an N4 session is established.

At 306, the method may include, based on determining that the client device does not support the AKMA functionality, buffering at least the first uplink data packet by the user plane function and determining whether the application supports the AKMA functionality. Although not shown in FIG. 3, if the user plane function determines that the client device does support AKAMA functionality, standards-based operations can be performed by the user plane function to support secure communications between the client device and the application (e.g., as prescribed by 3GPP TS 33.501 and 33.535). Returning to the present example, as shown at 308, the method may include, based on determining that the application supports the AKMA functionality, performing AKMA functionality by the user plane function for the client device for data communications between the client device and the application.

In one instance, performing the AKMA functionality by the user plane function for the client device further comprises encrypting packets obtained by the user plane function from the client device (which may include any packets that may be buffered by the user plane function) using an AKMA application key for the application (e.g., $K_{AF}$) to generate encrypted packets and transmitting the encrypted packets toward the application and performing the AKMA functionality by the user plane function for the client device further comprises decrypting packets obtained by the user plane function from the application using the AKMA application for the application to generate decrypted data packets and transmitting the decrypted data packets toward the client device.

In one instance, determining, by the user plane function, whether the application supports the AKMA functionality may be based on a configuration provided for the user plane function identifying that the application supports the AKMA functionality in which performing, by the user plane function, AKMA functionality for the client device further includes establishing, by the user plane function, a session with the application using the A-KID for the client device to obtain an AKMA application key for the application (e.g., via SMF 206)

In one instance, determining by the user plane function, whether the application supports the AKMA functionality may further include: communicating the first uplink data packet toward the application; obtaining a downlink data packet from the application; determining whether the downlink data packet includes an AKMA Initiation indication; and based on determining that the downlink data packet includes the AKMA Initiation indication, establishing, by the user plane function, a session with the application using the A-KID for the client device to obtain an AKMA application key for the application.

In one instance, performing the AKMA functionality by the user plane function for the client device may include the user plane function establishing a session with the application for the client device to obtain an AKMA application key ($K_{AF}$) for the application. In one instance, performing the AKMA functionality by the user plane function for the client device may include the user plane function encrypting and communicating at least the first uplink data packet toward the application using the AKMA application key ($K_{AF}$) for the application. In one instance, performing the AKMA functionality by the user plane function for the client device may include the user plane function decrypting and communicating one or more downlink data packets toward the client device using the AKMA application key ($K_{AF}$) for the application.

Figure 4:
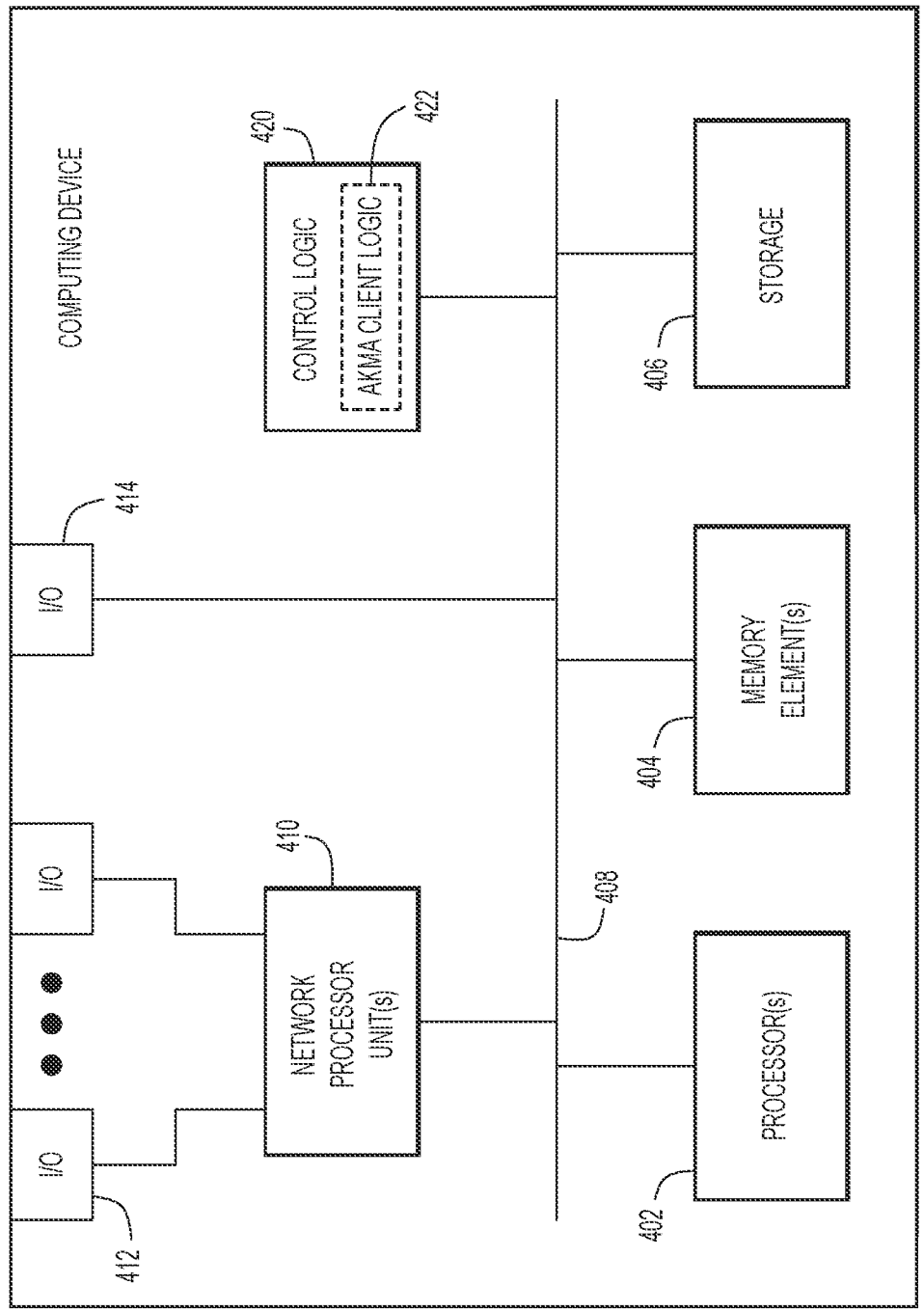
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein in order to perform operations of the various techniques discussed herein, such as UPF 210 including AKMA client logic 212, AMF 204, SMF 206, UDM 208, AUSF 214, AAnF 216, and AF 218.

In at least one embodiment, computing device 400 may be any apparatus that may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. For embodiments in which computing device 400 may be implemented as a UPF, control logic 420 may further be configured with AKMA client logic 422. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420 and/or AKMA client logic 422) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communications (wired and/or wirelessly) between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) and/or antennas/antenna arrays now known or hereafter developed. Thus, the network processor unit(s) 410 and/or network I/O interface(s) 412 may include suitable interfaces for receiving, transmitting, and/or otherwise communicating (in a wired and/or wireless manner) data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 and AKMA client logic 422, if implemented (e.g., for a UPF), can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one embodiment in which computing device is implemented as a UPF, the control logic 420 and AKMA client logic 422 can include instructions that, when executed, cause processor(s) 402 to perform functions including obtaining, by the user plane function, a first uplink data packet from a client device, wherein the first uplink data packet is to be communicated to an application; determining, by the user plane function based on the first uplink data packet, whether the client device supports an Authentication and Key Management for Applications (AKMA) functionality; based on determining that the client device does not support the AKMA functionality, buffering at least the first uplink data packet by the user plane function and determining whether the application supports the AKMA functionality; and based on determining that the application supports the AKMA functionality, performing AKMA functionality by the user plane function for the client device for data communications between the client device and the application.

Figure 5:
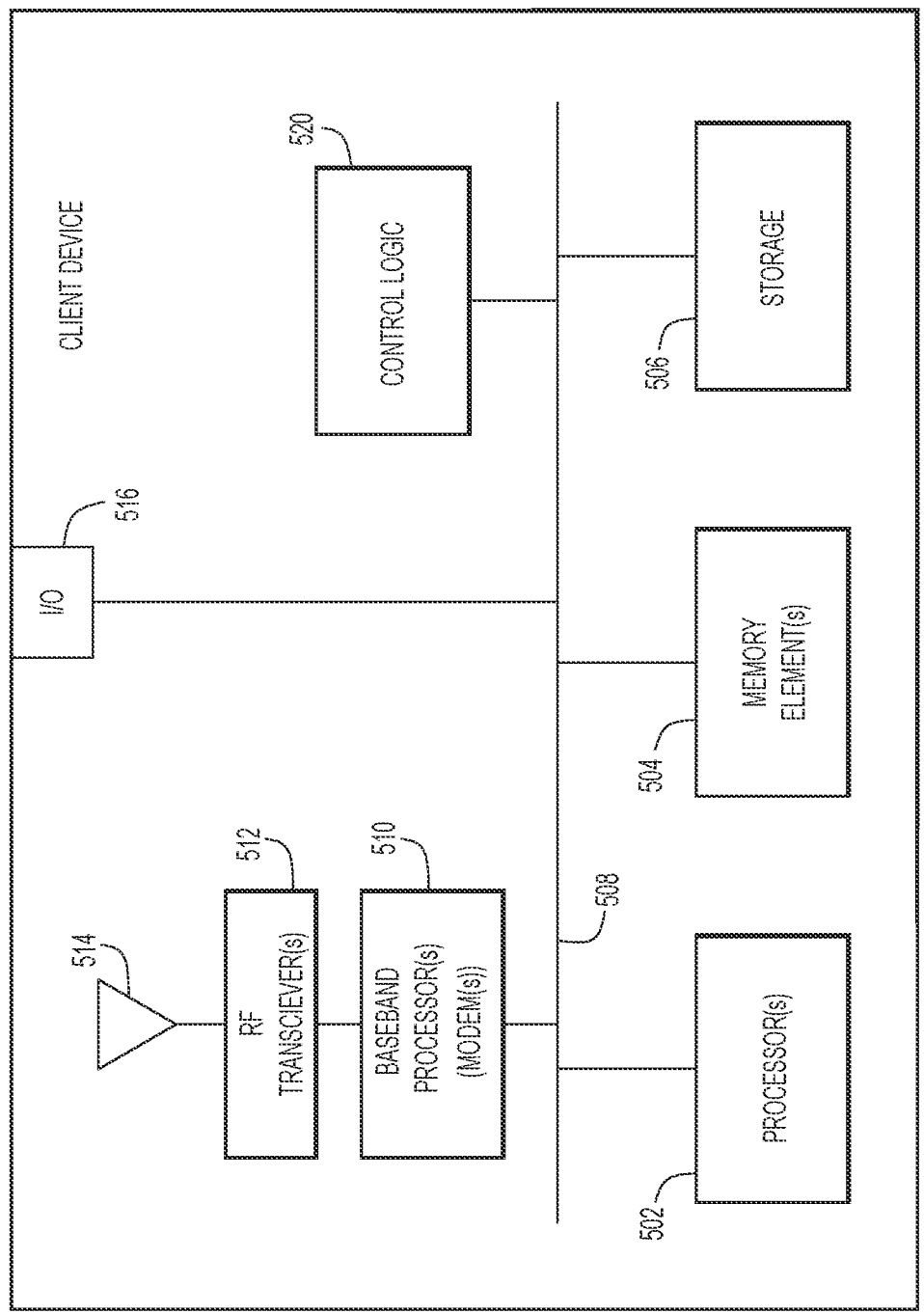
FIG. 5 is a hardware block diagram of a client device that may perform functions associated with any combination of operations, in connection with the techniques discussed herein.

Referring to FIG. 5, FIG. 5 illustrates a hardware block diagram of a client device 500 that may perform functions associated with operations discussed herein. In various embodiments, a radio device or apparatus, such as client device 500 or any combination of client devices 500, may be configured as any user equipment/radio node/nodes as depicted herein in order to perform operations of the various techniques discussed herein, such as operations that may be performed by client device 202, according to an example embodiment.

In at least one embodiment, client device 500 may be any apparatus that may include one or more processor(s) 502, one or more memory element(s) 504, storage 506, a bus 508, a baseband processor or modem 510, one or more radio RF transceiver(s) 512, one or more antennas or antenna arrays 514, one or more I/O interface(s) 516, and control logic 520.

The one or more processor(s) 502, one or more memory element(s) 504, storage 506, bus 508, and I/O interface(s) 516 may be configured/implemented in any manner described herein, such as described herein at least with reference to FIG. 4. In at least one embodiment, any combination of memory element(s) 504 and/or storage 506.

The RF transceiver(s) 512 may perform RF transmission and RF reception of wireless signals via antenna(s)/antenna array(s) 514, and the baseband processor (modem) 510 performs baseband modulation and demodulation, etc. associated with such signals to enable wireless communications for client device 500.

In various embodiments, control logic 520 can include instructions that, when executed, cause processor(s) 502 to perform operations, which can include, but not be limited to, providing overall control operations of client device 500; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420 and/or AKMA client logic 422 (if implemented) of computing device 400 and/or control logic 520 of client device 500) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 404 of computing device 400 and memory element(s) 504 of client device 500) and/or storage (e.g., storage 406 of computing device 400 and storage 506 of client device 500) can store data, software, code, instructions (e.g., processor instructions), logic, parameters, combinations thereof, and/or the like used for operations described herein. This includes memory element(s) 404/504 and/or storage 406/506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a user plane function, a first uplink data packet from a client device, wherein the first uplink data packet is to be communicated to an application; determining, by the user plane function based on the first uplink data packet, whether the client device supports an Authentication and Key Management for Applications (AKMA) functionality; based on determining that the client device does not support the AKMA functionality, buffering at least the first uplink data packet by the user plane function and determining whether the application supports the AKMA functionality; and based on determining that the application supports the AKMA functionality, performing AKMA functionality by the user plane function for the client device for data communications between the client device and the application.

In one instance, performing the AKMA functionality by the user plane function for the client device may include the user plane function establishing a session with the application for the client device to obtain an AKMA application key ($K_{AF}$) for the application. In one instance, performing the AKMA functionality by the user plane function for the client device may include the user plane function encrypting and communicating at least the first uplink data packet toward the application using the AKMA application key for the application. In one instance, performing the AKMA functionality by the user plane function for the client device may include the user plane function decrypting and communicating one or more downlink data packets toward the client device using the AKMA application key for the application.

In one instance, determining that the client device does not support the AKMA functionality includes the user plane function determining that the first uplink data packet does not include an AKMA key identifier (A-KID) for the client device. In one instance, the method may further include prior to obtaining the first uplink data packet from the client device for the application, obtaining, by the user plane function, an AKMA key identifier (A-KID) for the client device.

In one instance, determining, by the user plane function, whether the application supports the AKMA functionality is based on a configuration provided for the user plane function identifying that the application supports the AKMA functionality, wherein performing, by the user plane function, AKMA functionality for the client device further comprises: establishing, by the user plane function, a session with the application using the A-KID for the client device to obtain an AKMA application key for the application. The AKMA application key can be obtained from a Session Management Function (SMF).

In one instance, determining by the user plane function, whether the application supports the AKMA functionality may include: communicating the first uplink data packet toward the application; obtaining a downlink data packet from the application; determining whether the downlink data packet includes an AKMA Initiation indication; and based on determining that the downlink data packet includes the AKMA Initiation indication, establishing, by the user plane function, a session with the application using the A-KID for the client device to obtain an AKMA application key for the application. The AKMA application key can be obtained from a Session Management Function (SMF).

In one instance, performing the AKMA functionality by the user plane function for the client device further comprises encrypting packets obtained by the user plane function from the client device using an AKMA application key for the application to generate encrypted packets and transmitting the encrypted packets toward the application and performing the AKMA functionality by the user plane function for the client device further comprises decrypting packets obtained by the user plane function from the application using the AKMA application for the application to generate decrypted data packets and transmitting the decrypted data packets toward the client device.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a user plane function, a first uplink data packet from a client device, wherein the first uplink data packet is to be communicated to an application;
determining, by the user plane function based on the first uplink data packet, whether the client device supports an Authentication and Key Management for Applications (AKMA) functionality;
based on determining that the client device does not support the AKMA functionality, buffering at least the first uplink data packet by the user plane function and determining whether the application supports the AKMA functionality; and
based on determining that the application supports the AKMA functionality, performing AKMA functionality by the user plane function for the client device for data communications between the client device and the application.

2. The method of claim 1, wherein performing the AKMA functionality by the user plane function for the client device further comprises the user plane function establishing a session with the application for the client device to obtain an AKMA application key for the application.

3. The method of claim 2, wherein performing the AKMA functionality by the user plane function for the client device further comprises the user plane function encrypting and communicating at least the first uplink data packet toward the application using the AKMA application key for the application.

4. The method of claim 2, wherein performing the AKMA functionality by the user plane function for the client device further comprises the user plane function decrypting and communicating one or more downlink data packets toward the client device using the AKMA application key for the application.

5. The method of claim 1, wherein determining that the client device does not support the AKMA functionality includes the user plane function determining that the first uplink data packet does not include an AKMA key identifier (A-KID) for the client device.

6. The method of claim 1, further comprising:
prior to obtaining the first uplink data packet from the client device for the application, obtaining, by the user plane function, an AKMA key identifier (A-KID) for the client device.

7. The method of claim 6, wherein determining, by the user plane function, whether the application supports the AKMA functionality is based on a configuration provided for the user plane function identifying that the application supports the AKMA functionality, wherein performing, by the user plane function, the AKMA functionality for the client device further comprises:
establishing, by the user plane function, a session with the application using the A-KID for the client device to obtain an AKMA application key for the application.

8. The method of claim 7, wherein the AKMA application key is obtained from a Session Management Function (SMF).

9. The method of claim 6, wherein determining by the user plane function, whether the application supports the AKMA functionality further comprises:

communicating the first uplink data packet toward the application;
obtaining a downlink data packet from the application;
determining whether the downlink data packet includes an AKMA Initiation indication; and
based on determining that the downlink data packet includes the AKMA Initiation indication, establishing, by the user plane function, a session with the application using the A-KID for the client device to obtain an AKMA application key for the application.

10. The method of claim 1, wherein performing the AKMA functionality by the user plane function for the client device further comprises encrypting packets obtained by the user plane function from the client device using an AKMA application key for the application to generate encrypted packets and transmitting the encrypted packets toward the application and performing the AKMA functionality by the user plane function for the client device further comprises decrypting packets obtained by the user plane function from the application using the AKMA application for the application to generate decrypted data packets and transmitting the decrypted data packets toward the client device.

11. One or more non-transitory computer readable storage media encoded with instructions that, when executed by a processor, cause the processor to perform operations, comprising:
obtaining, by a user plane function, a first uplink data packet from a client device, wherein the first uplink data packet is to be communicated to an application;
determining, by the user plane function based on the first uplink data packet, whether the client device supports an Authentication and Key Management for Applications (AKMA) functionality;
based on determining that the client device does not support the AKMA functionality, buffering at least the first uplink data packet by the user plane function and determining whether the application supports the AKMA functionality; and
based on determining that the application supports the AKMA functionality, performing AKMA functionality by the user plane function for the client device for data communications between the client device and the application.

12. The media of claim 11, wherein performing the AKMA functionality by the user plane function for the client device further comprises the user plane function establishing a session with the application for the client device to obtain an AKMA application key for the application.

13. The media of claim 12, wherein performing the AKMA functionality by the user plane function for the client device further comprises the user plane function encrypting and communicating at least the first uplink data packet toward the application using the AKMA application key for the application.

14. The media of claim 12, wherein performing the AKMA functionality by the user plane function for the client device further comprises the user plane function decrypting and communicating one or more downlink data packets toward the client device using the AKMA application key for the application.

15. The media of claim 11, wherein determining that the client device does not support the AKMA functionality includes the user plane function determining that the first uplink data packet does not include an AKMA key identifier (A-KID) for the client device.

16. The media of claim 11, further comprising instructions that, when executed by the processor, cause the processor to perform further operations, comprising:

prior to obtaining the first uplink data packet from the client device for the application, obtaining, by the user plane function, an AKMA key identifier (A-KID) for the client device.

17. The media of claim 16, wherein determining, by the user plane function, whether the application supports the AKMA functionality is based on a configuration provided for the user plane function identifying that the application supports the AKMA functionality, wherein performing, by the user plane function, AKMA functionality for the client device further comprises:

establishing, by the user plane function, a session with the application using the A-KID for the client device to obtain an AKMA application key for the application.

18. The media of claim 16, wherein determining by the user plane function, whether the application supports the AKMA functionality further comprises:

communicating the first uplink data packet toward the application;

obtaining a downlink data packet from the application;

determining whether the downlink data packet includes an AKMA Initiation indication; and based on determining that the downlink data packet includes the AKMA Initiation indication, establishing, by the user plane function, a session with the application using the A-KID for the client device to obtain an AKMA application key for the application.

19. A user plane function comprising:

at least one memory element for storing data; and at least one processor for executing instructions associated with the data, wherein executing the instructions causes the user plane function to perform operations, comprising:

obtaining, by the user plane function, a first uplink data packet from a client device, wherein the first uplink data packet is to be communicated to an application;

determining, by the user plane function based on the first uplink data packet, whether the client device supports an Authentication and Key Management for Applications (AKMA) functionality;

based on determining that the client device does not support the AKMA functionality, buffering at least the first uplink data packet by the user plane function and determining whether the application supports the AKMA functionality; and based on determining that the application supports the AKMA functionality, performing AKMA functionality by the user plane function for the client device for data communications between the client device and the application.

20. The user plane function of claim 19, wherein performing the AKMA functionality by the user plane function for the client device further comprises encrypting packets obtained by the user plane function from the client device using an AKMA application key for the application to generate encrypted packets and transmitting the encrypted packets toward the application and performing the AKMA functionality by the user plane function for the client device further comprises decrypting packets obtained by the user plane function from the application using the AKMA application for the application to generate decrypted data packets and transmitting the decrypted data packets toward the client device.

* * * * *